(No Model.)

W. C. BRONSON.
BOILER FOR STEAM HEATERS.

No. 365,670. Patented June 28, 1887.

WITNESSES:
W. R. Davis.
C. Sedgwick.

INVENTOR:
W. C. Bronson
BY Munn & Co.
ATTORNEYS.

UNITED STATES PATENT OFFICE.

WILLIAM C. BRONSON, OF SARATOGA SPRINGS, NEW YORK.

BOILER FOR STEAM-HEATERS.

SPECIFICATION forming part of Letters Patent No. 365,670, dated June 28, 1887

Application filed May 4, 1887. Serial No. 237,080. (No model.)

*To all whom it may concern:*

Be it known that I, WILLIAM C. BRONSON, of Saratoga Springs, in the county of Saratoga and State of New York, have invented a new and Improved Boiler for Steam-Heaters, of which the following is a full, clear, and exact description.

This invention relates to steam-heating apparatus, the object of the invention being to improve the construction of the heaters illustrated, described, and claimed in Letters Patent No. 300,207, granted to me on the 10th day of June, 1884, and Letters Patent No. 345,879, granted to me on the 20th of July, 1886, the present invention consisting in the construction and arrangement of parts, as will be hereinafter more fully described, and specifically pointed out in the claims.

Reference is to be had to the accompanying drawings, forming a part of this specification, in which similar figures of reference indicate corresponding parts in both the views.

Figure 1:
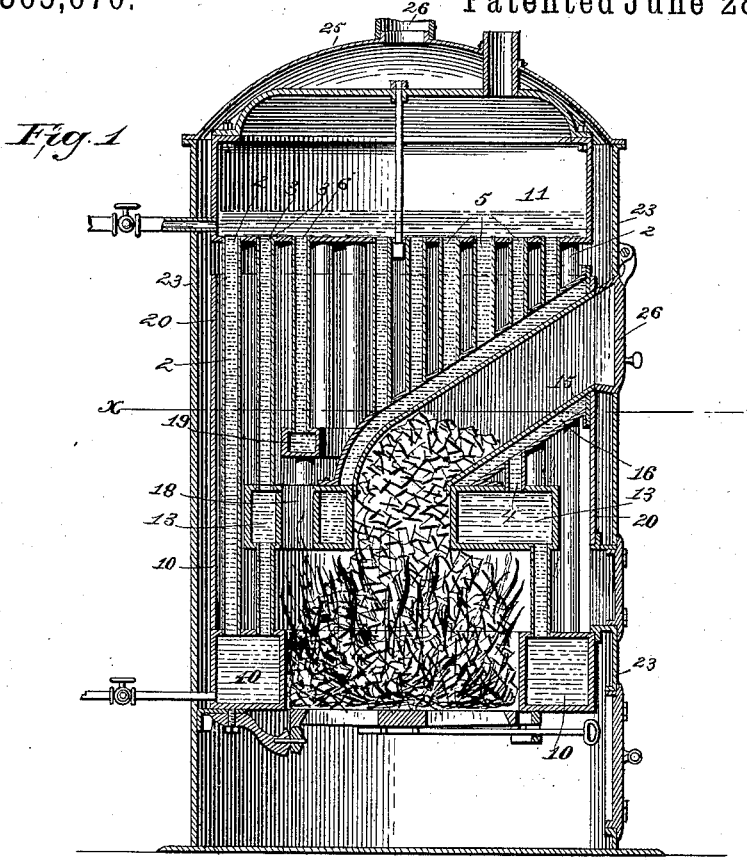
Figure 2:
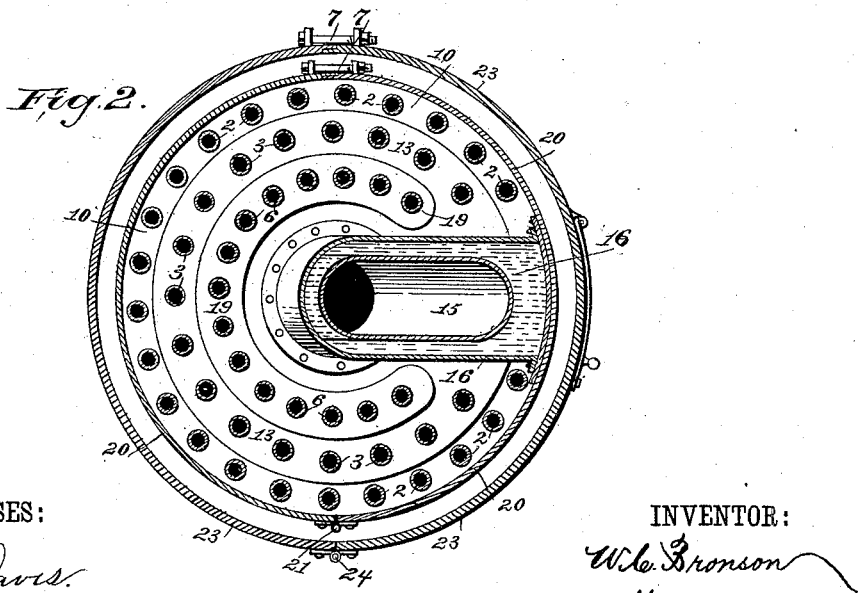

Figure 1 is a central vertical sectional view of my improved form of heater, and Fig. 2 is a sectional plan view taken on line *x x* of Fig. 1.

In the drawings, 10 represents the lower or main water-chamber, and 11 the dome of the boiler, the dome and the lower water-chamber being in direct communication through the medium of a series of pipes 2, and in indirect communication through a second series of pipes, 3, said second series of pipes leading from the lower chamber, 10, to a chamber, 13, and then upward to the dome 11. This chamber 13 is centrally apertured, as shown in Fig. 1, and the inner walls of a chute, 15, are riveted to the defining walls of this central aperture. The walls of the chute 15 are surrounded by a jacket, 16, the lower end of this jacket being flanged and being riveted to the casing of the water-chamber 13, while connecting-tubes, as 4, lead from the chamber 13 to the water-space between the chute and its jacket 16, the upper portion of said water-space being in communication with the dome 11 through the medium of pipes 5, located as best shown in Fig. 1. A circular aperture or opening, 18, is formed in the case of the chamber 13, and above this aperture there is arranged a horseshoe-shaped case, 19, which communicates with the dome 11 by means of pipes or tubes 6. An inner casing, 20, formed in two semi-cylindrical sections that are united by a hinge-joint, 21, is arranged about the outer series of tubes 2, this casing resting upon the upper walls of the main water-chamber 10, the upper end of the casing 20 extending to a distance, preferably of about five inches, below the lower wall of the dome 11. An outer casing, 23, also made in semi-cylindrical sections that are united by hinge-joints, as shown at 24, surrounds the entire structure hereinbefore described, and this casing is surmounted by a top or cover, 25, which is arranged for connection with a smoke-stack, 26, the two sections of the covers or casings 20 and 23 being connected by bolts, as 7. Appropriate apertures for the feeding, fire, and ash-pit doors, and for such other doors as may be required, are formed in the casings 20 and 23, the doors 26, arranged in connection with the chute 15, being formed with an inwardly-extending flange, which fits closely about the open mouth of the chute, as illustrated.

From the construction described it will be seen that all danger of burning out or injuring the chute by overheating is rendered impossible, owing to the fact that said chute is surrounded by a water-jacket, and in practice it will be found that such a boiler as the one described when provided with automatic regulating attachments will run perfectly well for twenty-four hours without attention.

Having thus fully described my invention, I claim as new and desire to secure by Letters Patent—

1. In a boiler, the combination, with upper and lower water-chambers, an intermediate water-chamber, and tubes connecting the several chambers, of a chute, a water-jacket surrounding said chute, and tubes connecting the intermediate water-chamber and the upper water-chamber with the water-jacket, substantially as described.

2. In a heater, the combination, with a lower ring forming a water-chamber, 10, of a dome, 11, constituting an upper water chamber or reservoir, an intermediate water-chamber, a chute arranged in connection with the casing of the intermediate water-chamber, a water-jacket surrounding the chute, and a fourth water-chamber in horseshoe form that is arranged above an aperture formed in the intermediate water-chamber, all parts being connected by water-tubes, substantially as described.

WILLIAM C. BRONSON.

Witnesses:
JOHN R. PUTNAM,
S. M. SYLVESTER.